US012640637B2

(12) United States Patent
Thakkar

(10) Patent No.: US 12,640,637 B2
(45) Date of Patent: May 26, 2026

(54) HYSTERETIC CONTROL FOR LOAD TRANSIENT IMPROVEMENT IN PEAK CURRENT CONTROL MODE POWER CONVERTER ARCHITECTURES

(71) Applicant: Cypress Semiconductor Corporation, San Jose, CA (US)

(72) Inventor: Bindish Laxmikant Thakkar, Bengaluru (IN)

(73) Assignee: Infineon Technologies Americas Corp., El Segundo, CA (US)

( * ) Notice: Subject to any disclaimer, the term of this patent is extended or adjusted under 35 U.S.C. 154(b) by 217 days.

(21) Appl. No.: 18/431,802

(22) Filed: Feb. 2, 2024

(65) Prior Publication Data

US 2025/0253752 A1 Aug. 7, 2025

(51) Int. Cl.
*H02M 3/158* (2006.01)
*H02M 1/00* (2006.01)
(52) U.S. Cl.
CPC ......... *H02M 1/0003* (2021.05); *H02M 3/158* (2013.01)

(58) Field of Classification Search
CPC .... H02M 3/158; H02M 3/156; H02M 3/1563; H02M 3/1566; H02M 3/157; H02M 3/1582; H02M 3/1584; H02M 3/1586; H02M 3/1588; H02M 1/0003; H02M 1/0006; H02M 1/0009; H02M 1/0016; H02M 1/0025
See application file for complete search history.

(56) References Cited

U.S. PATENT DOCUMENTS

| | | | | |
|---|---|---|---|---|
| 10,122,272 | B1 * | 11/2018 | Nogawa | H02M 1/08 |
| 2007/0085520 | A1 * | 4/2007 | Ho | H02M 3/1588 |
| | | | | 323/282 |
| 2020/0287464 | A1 * | 9/2020 | Lu | H02M 3/157 |
| 2020/0393862 | A1 * | 12/2020 | Yu | G06F 1/26 |

* cited by examiner

*Primary Examiner* — Nguyen Tran

(57) ABSTRACT

In some embodiments, a system includes a power conversion system including at least one driver operatively coupled to at least one switch, a hysteretic control system, and driver control circuitry, operatively coupled to the at least one driver and the hysteretic control system, to receive at least one driver control signal from the hysteretic control system, and to control, based on the at least one driver control signal, operation of the at least one driver.

20 Claims, 5 Drawing Sheets

HYSTERETIC CONTROL FOR LOAD TRANSIENT IMPROVEMENT IN PEAK CURRENT CONTROL MODE POWER CONVERTER ARCHITECTURES

TECHNICAL FIELD

This disclosure relates to integrated circuits (ICs) that control power delivery to electronic devices.

BACKGROUND

Various electronic devices (e.g., such as smartphones, tablets, notebook computers, laptop computers, chargers, adapters, power banks, etc.) are configured to transfer power through connectors according to power delivery protocols. For example, in some applications an electronic device may be configured as a power consumer to receive power through a connector (e.g., for battery charging), while in other applications an electronic device may be configured as a power provider to provide power to another device that is connected thereto through a connector. In various applications, electronic manufacturers may also use power converters that need to meet various specification requirements such as, for example, load transient requirements for output voltage (Vout) and stability. A power converter is a system that can generate some direct current (DC) output from a given input provided by a power source, that can be usable by an electronic device.

BRIEF DESCRIPTION OF THE DRAWINGS

The disclosure is illustrated by way of example, and not of limitation, in the figures of the accompanying drawings.

FIGS. 2-4B are schematic diagrams of example portions of a power conversion system, according to some embodiments.

DETAILED DESCRIPTION

Figure 1:
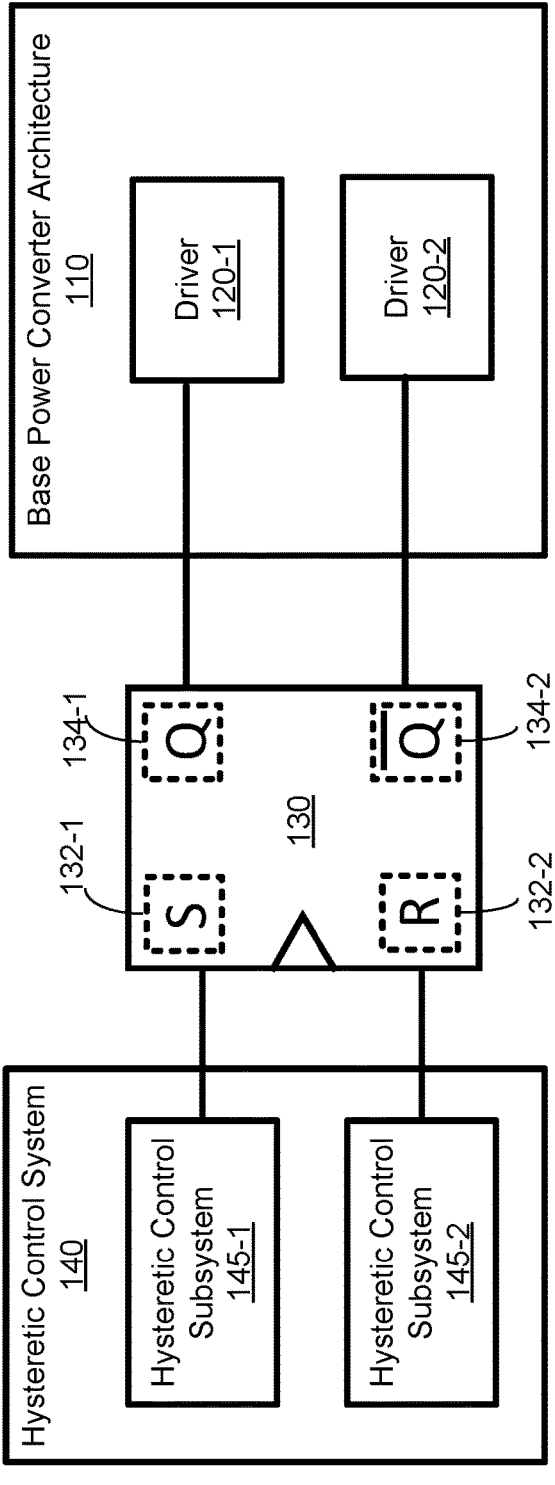
FIG. 1 is a block diagram of a high-level overview of a power conversion system, according to some embodiments.

Described herein are various embodiments for implementing hysteretic control for load transient improvement in peak current control mode power converter architectures. A power converter generally operates by temporarily storing input energy in the magnetic field of an inductor (e.g., inductor or transformer), and supplying the input energy to different loads at varying voltage levels. One type of power converter is a DC-to-DC converter. Examples of DC-to-DC converters include buck converters (e.g., step-down converters), boost converters (e.g., step-up converters), buck-boost converters, etc. A buck converter decreases voltage while increasing current from an input (e.g., supply) to an output (e.g., load). A boost converter increases voltage while decreasing current from the input to the output. A buck-boost converter has an output voltage magnitude that is either greater than or less than the input voltage magnitude.

A power converter can cycle between an on-state and an off-state, which can be used to control power delivery. A buck converter can operate in accordance with a switching frequency, which can be fixed (e.g., static) or variable (e.g., dynamic). A power converter can be configured to operate in one or more operating modes based on the amount of time between receiving control signals in accordance with the switching frequency. Examples of operating modes include discontinuous conduction mode (DCM), continuous conduction mode (CCM), critical conduction mode (CrCM), quasi-resonant mode (QR), etc.

In some implementations, a power converter is implemented within a power adapter (e.g., DC-to-DC power adapter). Embodiments described herein can also be implemented in other types of power adapters, power converters, power delivery circuits, or the like. A power adapter described herein can include a power control subsystem having hardware, firmware, or any combination. A power adapter described herein can be coupled to electronic devices (e.g., loads) to enable power delivery. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use connectors (interfaces) for communication, battery charging, and/or power delivery.

Power converters, such as DC-to-DC converters, can provide a stable output voltage or current despite variations in the input voltage, load current, or other external factors. When there is a sudden change in the input or load, the output of the power converter may deviate from its desired value temporarily before returning to a steady state. The transient response of a power converter refers to the behavior of the power converter in response to a transient disturbance, which is a sudden changes or disturbances in the input or load conditions. That is, the transient response reflects how quickly and/or accurately the output of the power converter adjusts to transient disturbances. The transient response of a power converter can be characterized by parameters such as overshoot, undershoot, settling time, and steady-state error. Overshoot refers to the extent to which the output voltage exceeds the desired value during the transient response. A high overshoot can lead to instability and may be undesirable in some applications. Undershoot refers to the extent to which output voltage droops to desired value during load transient response. Settling time refers to the time it takes for the output to reach and stay within a specified range of the desired value after a transient disturbance. A shorter setting time generally indicates better performance. Steady-state error refers to the difference between the actual output and the desired output once the transient response has settled. A smaller steady-state error generally indicates better performance. Achieving an appropriate response can be important for a power delivery application of which a stable and precise output may be needed. For example, a power converter can be designed to minimize overshoot, minimize undershoot, reduce settling time, and/or minimize steady-state error to ensure reliable and efficient operation.

Described herein are various embodiments for implementing hysteretic control for load transient improvement in peak current control mode power converter architectures. Embodiments described herein can be used to implement power converters that are designed to operate in a peak current mode with improved transient response performance and decreased complexity in achieving stabilization. In some implementations, a power converter is a buck converter. Peak current control mode is a control strategy that can be used by a power converter to regulate the output voltage or current. In a peak current control mode, control circuitry measures the peak current flowing through a power switch (e.g., power transistor) during a switching cycle. The switching cycle is the period during which the power switch is on and off.

More specifically, a power converter described herein can achieve improved transient response performance while operating in a peak current control mode by implementing hysteretic control that reacts during a transient response. For example, a first hysteretic control subsystem can be coupled to a first input pin of flip flop circuitry (e.g., a set input pin) and a second hysteretic control subsystem can be coupled to a second input pin of the flip flop circuit (e.g., a reset input pin). A first driver can be coupled to a first output pin of the flip flop circuitry (e.g., Q pin) and a second driver can be coupled to a second output pin of the flip flop circuit (e.g., $\overline{Q}$ pin). The first and second drivers can be coupled to a base power converter subsystem (e.g., buck convert subsystem). Further details regarding achieving improved transient response performance in peak current control mode power converter architectures will be described below with reference to FIGS. 1-5.

Advantages of implementing hysteretic control for load transient improvement in peak current control mode power converter architectures, as described herein, include improved transient performance, reduced resource consumption, reduced stress on electrical components, increased flexibility, and programmability. Embodiments described herein can be used to reduce the number of external components per board, such as the number and/or sizes of capacitors, which can reduce overall power converter size. Accordingly, embodiments described herein can be used to fabricate systems and devices implementing power converters (e.g., power adapters) with smaller footprints and less circuitry, which can reduce manufacturing costs and reduce solution size.

FIG. 1 is a block diagram of a power conversion system ("system") 100, according to some embodiments. In some embodiments, system 100 implements a DC-to-DC converter having a peak current mode control architecture. In some embodiments, the DC-to-DC converter is a buck converter. Examples of DC-to-DC converters having peak current mode control architectures will be described below with reference to FIGS. 2-4B. In some embodiments, system 100 is included within a power adapter.

System 100 can include base power converter architecture 110 coupled to drivers 120-1 and 120-2. For example, base power converter architecture 110 can include an input to receive a current (e.g., DC) from an input source, an input capacitor, an output capacitor, an inductor, a first switch (e.g., high-side switch) and a second switch (e.g., low-side switch). In some implementations, the first switch is a first transistor and the second switch is a second transistor. In some implementations, base power converter architecture 110 includes a buck converter architecture. An example implementation of base power converter architecture 110 will be described below with reference to FIG. 2.

System 100 can further include drivers 120-1 and 120-2 coupled to base power converter architecture 110. Driver 120-1 can be coupled to the first switch (e.g., gate/source of the first transistor) and driver 120-2 can be coupled to the second switch (e.g., gate/source of the second transistor). System 100 can further include driver control circuitry 130 to control at least one of driver 120-1 or driver 120-2.

In some embodiments, driver control circuitry 130 includes state storage circuitry to store at least one bit of information. The state storage circuitry can be implemented by a flip-flop and/or as a latch. For example, as shown in FIG. 1, driver control circuitry 130 can include stage storage circuitry having inputs 132-1 and 132-2, and outputs 134-1 and 134-2. Output 134-1 is coupled to driver 120-1 and output 134-2 is coupled to driver 120-2. In some embodiments, and as shown, driver control circuitry 130 includes SR state storage circuitry (e.g., an SR flip-flop and/or an SR latch) having a set input(S) 132-1 and a reset input (R) 132-2, and outputs Q 134-1 and $\overline{Q}$ 134-2. In some embodiments, driver control circuitry 130 includes JK state storage circuitry (e.g., a JK flip-flop and/or a JK latch). In some embodiments, driver control circuitry 130 includes D state storage circuitry (e.g., a D flip-flop and/or a D latch). In some embodiments, driver control circuitry 130 includes a T state storage circuitry (e.g., a T flip-flop and/or a D latch).

System 100 can further include hysteretic control system 140 to control hysteresis in response to transients, which can enable system 100 to be stable during steady-state operation. As shown, hysteretic control system 140 can include hysteretic control subsystem 145-1 and hysteretic control subsystem 145-2. Hysteretic control subsystem 145-1 is coupled to input 132-1 to control set functionality of driver control circuitry 130 based on a hysteretic control signal received via a hysteretic control pin, and hysteretic control subsystem 145-2 is coupled to input 132-2 to control reset functionality of driver control circuitry 130 based on the hysteretic control signal.

Hysteretic control system 140 can be used to control the operation of driver 120-1 and/or driver 120-2. For example, if driver control circuitry 130 includes flip-flop circuitry, then driver 120-1 can be enabled (e.g., turned on) by setting the flip-flop circuitry of driver control circuitry 130. As another example, if driver control circuitry 130 includes flip-flop circuitry, then driver 120-1 can be disabled (e.g., turned off) by resetting the flip-flop circuitry of driver control circuitry 130.

The output of hysteretic control subsystem 145-1 can be the inverse of the output of hysteretic control subsystem 145-2. For example, if the output of hysteretic control subsystem 145-1 is high, then the output of hysteretic control subsystem 145-2 will be low (and vice versa). The output of hysteretic control subsystem 145-1 can be high if a feedback voltage of a feedback signal, received from a feedback signal input pin (FB), is less than a threshold voltage. In some embodiments, the threshold voltage is less than the reference voltage ($V_{REF}$) of system 100. In some embodiments, the threshold voltage ranges between about 97% and 99% of $V_{REF}$. Thus, the output of hysteretic control subsystem 145-1 can be high and the output of hysteretic control subsystem 145-2 can be low if the feedback voltage is less than the threshold voltage, and the output of hysteretic control subsystem 145-1 can be low and the output of hysteretic control subsystem 145-2 can be high if the feedback voltage is greater than or equal to the threshold voltage. More specifically, the threshold voltage can be defined based on a hysteresis voltage predetermined for system 100. In some embodiments, the hysteresis voltage ranges from about 3 millivolts (mV) to about 5 millivolts (mV). Thus, if the feedback voltage is less than the hysteresis voltage, then hysteretic control subsystem 145-1 can enable driver 120-1 (e.g., by triggering the set functionality of the flip-flop circuitry of driver control circuitry 130). Moreover, if the feedback voltage is greater than or equal to the hysteresis voltage, then hysteretic control subsystem 145-2 can disable driver 120-1 (e.g., by triggering) the reset functionality of the state storage circuitry of driver control circuitry 130), with assistance by peak current model control circuitry. An example implementation of hysteretic control subsystem 145-1 is described below with reference to FIG. 3 and an example implementation of hysteretic control subsystem 145-2 is described below with reference to FIGS. 4A-4B.

Figure 2:
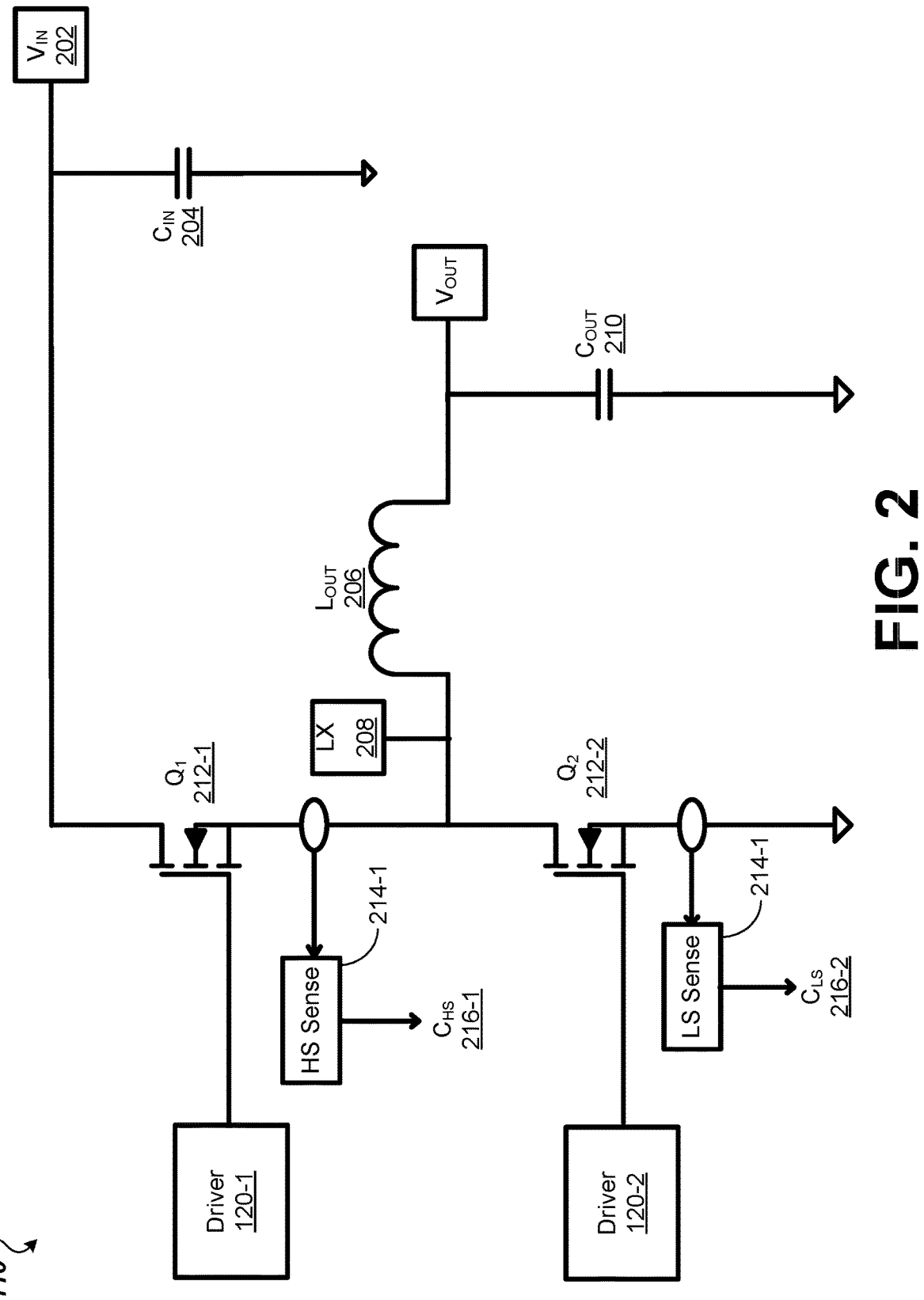

FIG. 2 is a schematic diagram of an example base power converter architecture 110, according to some embodiments. More specifically, base power converter architecture 110 can implement a portion of a DC-TO-DC peak current mode power converter architecture. As shown, base power converter architecture 110 can include drivers 120-1 and 120-2 as described above with reference to FIG. 1. As further shown, base power converter architecture 110 can further include input voltage pin (V$_{IN}$) 202, input capacitor (C$_{IN}$) 204, output inductor (L$_{OUT}$) 206, switch node (LX) pin 208 coupled to inductor 206, output capacitor (C$_{OUT}$) 210, high-side (HS) switch (Q$_1$) 212-1 coupled to driver 120-1, low-side (LS) switch (Q$_2$) 212-2 coupled to driver 120-2, HS sense component 214-1 coupled to Q$_1$ 212-1 and configured to sense HS current (C$_{HS}$) 216-1, and LS sense component 214-2 coupled to Q$_2$ 212-2 and configured to sense LS current (C$_{LS}$) 216-2.

Figures 3, 4A:
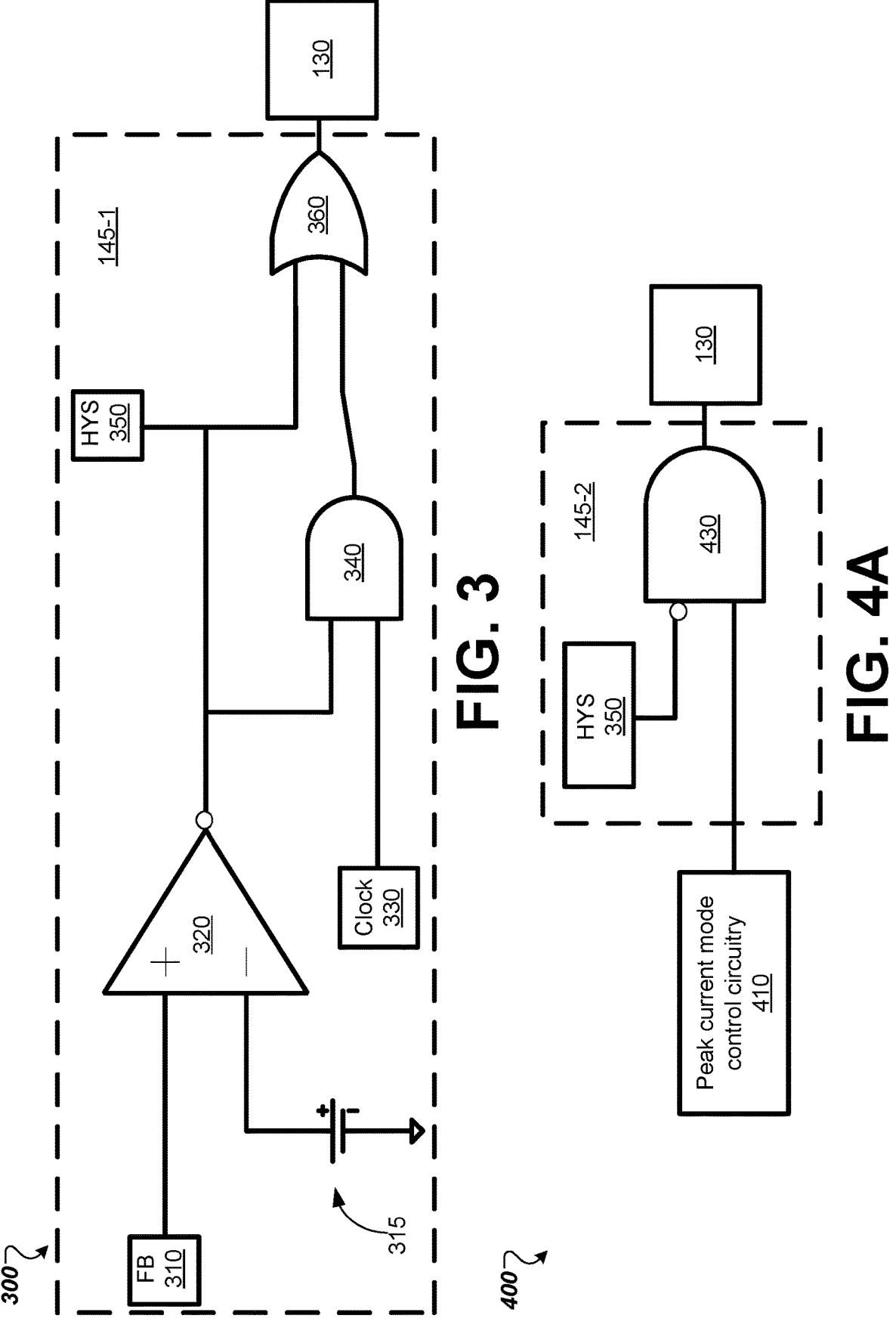

FIG. 3 is a schematic diagram of a portion of a power conversion system ("system portion") 300, according to some embodiments. The power conversion system be similar to system 100 of FIG. 1. System portion 300 includes driver control circuitry 130, and hysteretic control subsystem 145-1 to control the set functionality of driver control circuitry 130, as described above with reference to FIG. 1. For example, as shown in FIG. 3, hysteretic control subsystem 145-1 can include feedback signal input pin (FB) 310, reference voltage (V$_{REF}$) signal source 315, clock 330 to generate a clock signal, AND gate 340, hysteretic control pin (HYS) 350, and OR gate 360. However, such an implementation of hysteretic control subsystem 145-1 should not be considered limiting.

FB 310 and V$_{REF}$ signal source 315 are each coupled to a respective input terminal of comparator 320. For example, as shown in FIG. 3, FB 310 can be coupled to a positive terminal of comparator 320 and V$_{REF}$ signal source 315 can be coupled to a negative terminal of comparator 320. V$_{REF}$ signal source 315 can provide a V$_{REF}$ signal used by comparator 320 to generate a comparator output signal. In some embodiments, the V$_{REF}$ signal provided by V$_{REF}$ signal source 315 has a voltage that is less than V$_{REF}$. In some embodiments, the V$_{REF}$ signal provided by V$_{REF}$ signal source 315 has a voltage that ranges between about 97% and 99% of V$_{REF}$. More specifically, comparator 320 compares a feedback voltage of a feedback signal received from (e.g., sensed by) FB 310 to the V$_{REF}$ signal provided by V$_{REF}$ signal source 315 to determine a voltage difference and generate a comparator output signal (e.g., inverted comparator output signal, as shown in FIG. 3). The V$_{REF}$ signal generated by V$_{REF}$ signal source 315 can correspond to the threshold voltage described above with reference to FIG. 1. For example, the comparator signal will be high if the feedback voltage received from FB 310 is less than the voltage of the V$_{REF}$ signal provided by V$_{REF}$ signal source 315, and the comparator output signal will be low if the feedback voltage received from FB 310 is greater than or equal to the voltage of the V$_{REF}$ signal provided by V$_{REF}$ signal source 315. The comparator output signal output by comparator 320 (e.g., inverted comparator output signal, as shown in FIG. 3) and an output of clock 330 are each coupled to a respective input of AND gate 340. An output of AND gate 340 and an output of HYS 350 are each coupled to a respective input of OR gate 360. An output of OR gate 360 is coupled driver control circuitry 130 to control the functionality of driver control circuitry 130, and thus operation of at least one driver coupled to driver control circuitry 130. For example, the output of OR gate 360 can be coupled to a first input of flip-flop circuitry of driver control circuitry 130 to enable a first driver (e.g., HS driver), as described above with reference to FIG. 1.

FIG. 4A is a schematic diagram of a portion of a power conversion system ("system portion") 400, according to some embodiments. The power conversion system be similar to system 100 of FIG. 1. As shown in FIG. 4A, system portion 400 includes driver control circuitry 130, hysteretic control subsystem 145-2 and peak current mode control circuitry 410. For example, hysteretic control subsystem 145-2 can include HYS 350 of FIG. 3 and AND gate 430. However, such an implementation of hysteretic control subsystem 145-2 should not be considered limiting. An output of peak current mode control circuitry 410 and HYS 350 are each coupled to a respective input terminal of AND gate 430. For example, as shown in FIG. 4A, an inverted output of HYS 350 can be an input to AND gate 430. An output of AND gate 430 is coupled to driver control circuitry 130 to control the reset functionality of driver control circuitry 130. For example, the output of AND gate 430 can be coupled to a second input of flip-flop circuitry of driver control circuitry 130 to disable the first driver (e.g., HS driver), as described above with reference to FIG. 1. An example implementation of peak current mode control circuitry 410 will now be described below with reference to FIG. 4B.

Figure 4B:
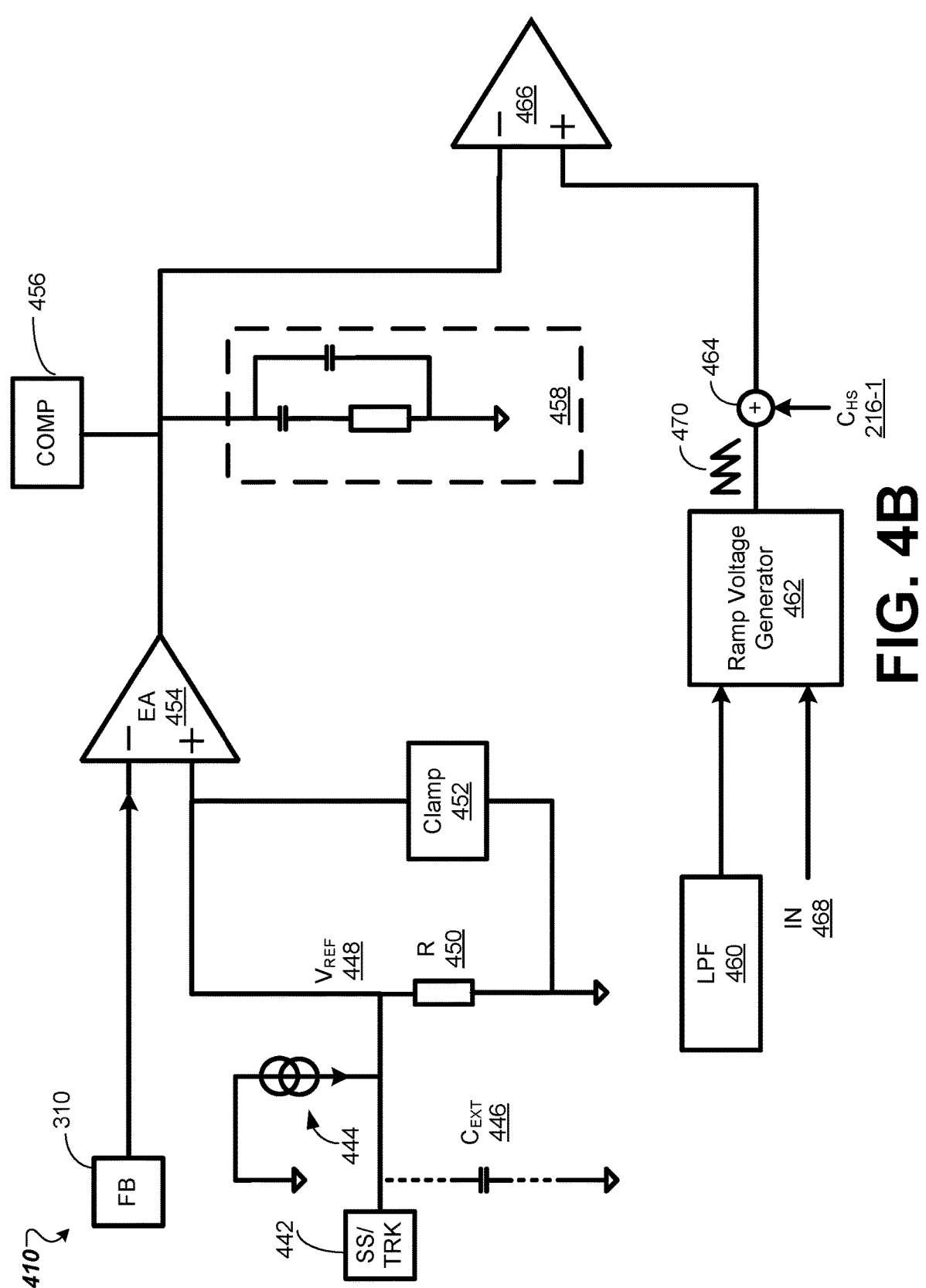

FIG. 4B is a block diagram of peak current mode control circuitry 410, according to some embodiments. For example, peak current mode control circuitry 410 can include FB 310 (e.g., as described above with reference to FIG. 3), soft start (e.g., startup) and tracking pin (SS/TRK) 442 to control the soft start of the power converter, constant current source 444, external capacitor (C$_{EXT}$) 446, V$_{REF}$ 448, resistor (R) 450, clamp 452, error amplifier (EA) 454, compensation pin (COMP) 456, compensation network 458, LX with low pass filter (LPF) 460, ramp voltage generator 462, combiner 464 and comparator 466. However, such an implementation of peak current mode control circuitry 410 should not be considered limiting.

EA 454 compares the feedback signal received from FB 310 to V$_{REF}$ 448 to determine a voltage difference and generates an EA signal. Compensation network 458 generates a compensated signal based on the EA signal generated by EA 454. An output of compensation network 458 can be coupled to a respective input terminal of comparator 466 (e.g., negative terminal as shown in FIG. 4B). LPF 460 can receive an LX voltage and generate an output based on the LX voltage. Ramp voltage generator 462 can generate, based on the output of LPF 460 and an input voltage (IN) 468, ramp voltage 470. In some embodiments, ramp voltage 470 is a sawtooth ramp voltage waveform. Combiner 464 can receive ramp voltage 470 and an C$_{HS}$ 216-1 (described above with reference to FIG. 2) to generate a combined signal. The output of combiner 464 can be coupled to a respective input terminal of comparator 466 (e.g., positive terminal as shown in FIG. 4B). Comparator 466 compares the inputs received at its terminals (e.g., the compensated signal received from compensation network 458 to the combined signal received from combiner 464) to determine a voltage difference and generate a comparator output signal. An output of comparator 466 can be coupled to hysteretic control subsystem 145-2 (e.g., the respective input of AND gate 430 as described above with reference to FIG. 4A) to receive the comparator output signal generated by comparator 466.

Figure 5:
FIG. 5 is a flow diagram of example method of implementing hysteretic control for load transient improvement in peak current control mode power converter architectures, according to some embodiments.
Figure 5:
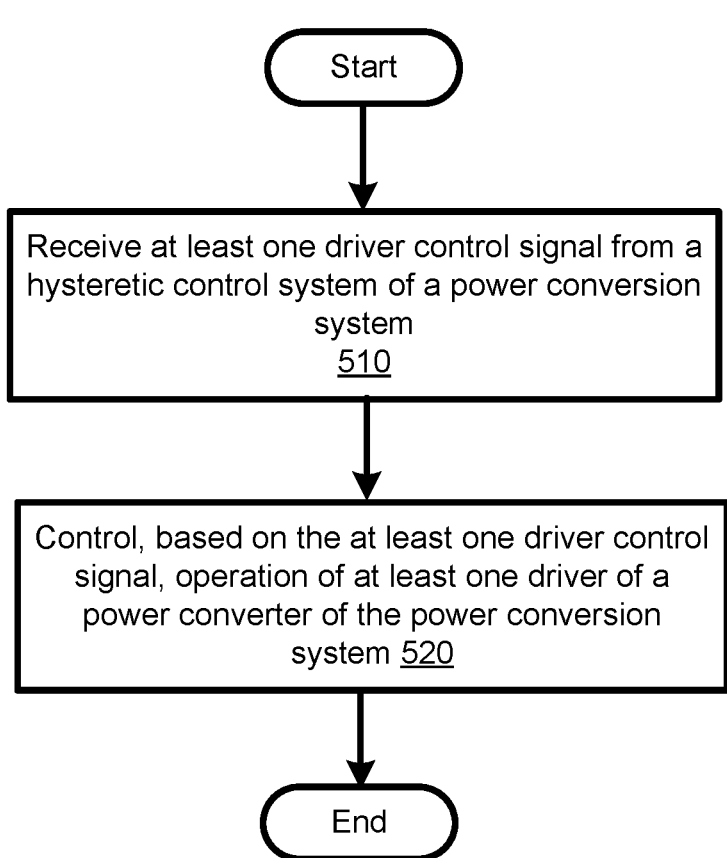

FIG. 5 is a flow diagram of an example method 500 of implementing hysteretic control for load transient improvement in peak current control mode power converter architectures, according to some embodiments, according to some embodiments. Method 500 may be performed by at least one processing device that comprises hardware (e.g., circuitry, dedicated logic, programmable logic, microcode, etc.), software, firmware, or a combination thereof. In some embodiments, driver control circuitry 130 of FIG. 1 performs method 500.

At operation 510, at least one driver control signal is received from a hysteretic control system of a power conversion system. For example, the hysteretic control system can include a first hysteretic control subsystem operatively coupled to a first input of driver control circuitry (e.g., hysteretic control subsystem 145-1 operatively coupled to input 132-1 of driver control circuitry 130 of FIGS. 1-4A), and a second hysteretic control subsystem operatively coupled to a second input of the driver control circuitry (e.g., hysteretic control subsystem 145-2 operatively coupled to input 132-2 of driver control circuitry 130 of FIGS. 1-4A). In some embodiments, the first input of the driver control circuitry is a set input of a flip-flop of the driver control circuitry and the second input of the driver control circuitry is a reset input of the flip-flop.

The at least one driver control signal can be received from at least one hysteretic control subsystem. More specifically, the first hysteretic control subsystem can generate a first driver control signal that controls set functionality of the driver control circuitry and/or the peak current mode control circuitry, and the second hysteretic control subsystem can generate a second driver control signal that controls reset functionality of driver control circuitry and/or the peak current mode control circuitry. The first driver control signal and/or the second driver control signal can be generated based on a hysteretic control signal received via a hysteretic control pin. The first driver control signal can be the inverse of the second driver control signal.

The first hysteretic control subsystem can receive the hysteretic control signal from a hysteretic control signal pin and a feedback signal from a feedback signal input pin, and can generate the first driver control signal based on the hysteretic control signal and the feedback signal. For example, the hysteretic control signal pin can be similar to HYS 350 of FIGS. 3-4A, and the feedback signal input pin can be similar to FB 310 of FIGS. 3 and 4B.

More specifically, the first driver control signal output by the first hysteretic control subsystem can be high if a feedback voltage of the feedback signal is less than a threshold voltage. In some embodiments, the threshold voltage is less than the reference voltage ($V_{REF}$) of the power conversion system. In some embodiments, the threshold voltage ranges between about 97% and 99% of $V_{REF}$. Thus, the first driver control signal output by the first hysteretic control subsystem can be high and the second driver control signal output by the second hysteretic control subsystem can be low if the feedback voltage is less than the threshold voltage, and the first driver control signal output by the first hysteretic control subsystem can be low and the second driver control signal output by the second hysteretic control subsystem can be high if the feedback voltage is greater than or equal to the threshold voltage and the signal from the peak current mode circuitry is high. More specifically, the threshold voltage can be defined based on a hysteresis voltage predetermined for the power conversion system. In some embodiments, the hysteresis voltage ranges from about 3 mV to about 5 mV. Thus, if the feedback voltage is less than the hysteresis voltage, then the first hysteretic control subsystem can trigger the set functionality of the driver control circuitry. Moreover, if the feedback voltage is greater than or equal to the hysteresis voltage, then the second hysteretic control subsystem can trigger the reset functionality of the driver control circuitry if the signal from peak current mode circuitry is high. An example implementation of the first hysteretic control subsystem is described above with reference to FIG. 3A.

The second hysteretic control subsystem can be operatively coupled to peak current mode control circuitry (e.g., peak current mode control circuitry 410 of FIGS. 4A-4B). The second hysteretic control subsystem can receive the hysteretic control signal and an peak current control circuitry signal output by the peak current mode control circuitry, and can generate the second driver control signal based the hysteretic control signal and the peak current control circuitry signal. In some embodiments, the second hysteretic control subsystem includes an AND gate that generates the second driver control signal based on the hysteretic control signal and the peak current control circuitry signal More specifically, the second driver control signal can use the An example implementation of the second hysteretic control subsystem is described above with reference to FIG. 4A, and an example implementation of the peak current mode control circuitry is described above with reference to FIG. 4B.

At operation 520, at least one driver of a power converter of the power conversion system is controlled based on the at least one driver control signal. The power converter can include a first driver operatively coupled to a first switch to control operation of the first switch, and a first output of driver control circuitry to control operation of the first driver. The power converter can further include a second driver operatively coupled to a second switch to control operation of the second switch, and a second output of the driver control circuitry to control operation of the second driver. In some embodiments, the first driver is a high-side (HS) driver and the second driver is a low-side (LS) driver. In some embodiments, the first switch and the second switch are implemented using respective transistors. Controlling the at least one driver based on the at least one driver control signal can include enabling or disabling at least the first driver based on the at least one driver control signal. For example, the at least one driver control signal can control set or reset functionality of the driver control circuitry, which controls enablement or disablement of the first driver or the second driver. For example, if the first driver control signal is high, then the first driver control signal can set the driver control circuitry to enable (e.g., turn on) the first driver. As another example, if the first driver control signal is low, then the second driver control signal is high, which resets the driver control circuitry to disable (e.g., turn off) the first driver. Further details regarding operations 510-520 are described above with reference to FIGS. 1-4B.

In the above description, some portions may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "controlling," or the like, refer to the actions and processes of a system, or similar electronic device, that manipulates and transforms data represented as physical (e.g., electronic) quantities within the system's registers and memories into other data similarly represented as physical quantities within the system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, the use of the words "example" or "exemplary" is intended to present concepts concretely. As used in this application, the term "or" is intended to mean an inclusive "or" rather than an exclusive "or." Unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

The preceding description sets forth numerous specific details, such as examples of specific systems, components, methods, and so forth, in order to provide a good understanding of various embodiments of the techniques described herein. However, it will be apparent to one skilled in the art that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The above description sets forth numerous specific details, such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. Therefore, the disclosure scope should be determined with reference to the appended claims, along with the full scope of equivalents to which such claims are entitled.

What is claimed is:

1. A system comprising:
a power conversion system comprising:
    a first driver and a second driver;
    peak current mode control circuitry to generate a peak current mode control signal;
    a hysteretic control system to generate at least one of a first driver control signal or a second driver control signal that is an inverse of the first driver control signal; and
    driver control circuitry, having a first output operatively coupled to the first driver and a second output operatively coupled to the second driver, to receive at least one driver control signal from the hysteretic control system, and to control, based on at least one of the first driver control signal or the second driver control signal, operation of at least one of the first driver or the second driver;
    wherein the hysteretic control system comprises a first hysteretic control subsystem, operatively coupled to a first input of the driver control circuitry, to generate the first driver control signal based on a hysteretic control signal; and
    wherein the hysteretic control system further comprises a second hysteretic control subsystem operatively coupled to a second input of the driver control circuitry, the second hysteretic control subsystem being configured to generate the second driver control signal by performing a logical AND operation based on the hysteretic control signal and the peak current mode control.

2. The system of claim 1, wherein the hysteretic control system operates in response to a transient.

3. The system of claim 1, wherein the first input of the driver control circuitry is a set input of state storage circuitry comprising at least one of a flip-flop or a latch, and wherein the second input of the driver control circuitry is a reset input of the state storage circuitry.

4. The system of claim 1, wherein, to control the operation of at least one of the first driver or the second driver, the driver control circuitry is to:

enable the first driver in response to the first driver control signal being high; or disable the first driver in response to the first driver control signal being low.

5. The system of claim 1, wherein the first hysteretic control subsystem comprises:

a comparator to generate a comparator output signal based on a feedback signal and a reference signal each received by the comparator;

an AND gate to generate an AND gate output signal based on the comparator output signal and a clock signal each received by the AND gate; and an OR gate to generate the first driver control signal based on the hysteretic control signal and the AND gate output signal each received by the OR gate.

6. The system of claim 5, wherein the reference signal has a voltage that is less than a reference voltage for the power conversion system.

7. The system of claim 6, wherein the reference signal has a voltage that ranges between about 97% of the reference voltage and about 99% of the reference voltage.

8. The system of claim 1, wherein the peak current mode control circuitry comprises:

an error amplifier to generate an error amplifier signal based on a feedback signal and a reference signal each received by the error amplifier;

a compensation network to generate a compensated signal based on the error amplifier signal received by the compensation network;

a ramp voltage generator to generate a ramp voltage;

a combiner to generate a combined signal by combining the ramp voltage with a sensed current associated with a switch operatively coupled to the first driver; and a comparator to generate the second driver control signal based on the combined signal and the compensated signal each received by the comparator.

9. The system of claim 1, wherein the power conversion system implements a direct current (DC) to DC (DC-to-DC) converter.

10. A system comprising:

a power conversion system implementing a direct current (DC) to DC (DC-to-DC) converter operating in a peak current control mode, the power conversion system comprising:

a first driver operatively coupled to a first switch;

a second driver operatively coupled to a second switch;

a hysteretic control system, operating in response to a transient, the hysteretic control system comprising a first hysteretic control subsystem to generate a first driver control signal based on a hysteretic control signal, and a second hysteretic control subsystem to generate a second driver control signal that is an inverse of the first driver control signal;

driver control circuitry having a first input operatively coupled to the first hysteretic control subsystem, a second input operatively coupled to the second hysteretic control subsystem, a first output operatively coupled to the first driver and a second output operatively coupled to the second driver, the driver control circuitry to control, based on at least one of the first driver control signal or the second driver control signal, operation of at least one of the first driver or the second driver; and peak current mode control circuitry operatively coupled to the second hysteretic control subsystem and configured to generate a peak current mode control signal, wherein the second hysteretic control subsystem is configured to generate the second driver control signal by performing a logical AND operation based on the hysteretic control signal and the peak current mode control signal.

11. The system of claim 10, wherein the first input of the driver control circuitry is a set input of state storage circuitry comprising at least one of a flip-flop or a latch, and wherein the second input of the driver control circuitry is a reset input of the state storage circuitry.

12. The system of claim 10, wherein, to control operation of at least one of the first driver or the second driver, the driver control circuitry is to:

enable the first driver in response to the first driver control signal being high; or disable the first driver in response to the first driver control signal being low.

13. The system of claim 10, wherein the first hysteretic control subsystem comprises:

a comparator to generate a comparator output signal based on a feedback signal and a reference signal each received by the comparator, the reference signal having a voltage that is less than a reference voltage for the power conversion system;

an AND gate to generate an AND gate output signal based on the comparator output signal and a clock signal each received by the AND gate; and an OR gate to generate the first driver control signal based on the hysteretic control signal and the AND gate output signal each received by the OR gate.

14. The system of claim 10, wherein the peak current mode control circuitry comprises:

an error amplifier to generate an error amplifier signal based on a feedback signal and a reference signal;

a compensation network to generate a compensated signal based on the error amplifier signal;

a ramp voltage generator to generate a ramp voltage;

a combiner to generate a combined signal by combining the ramp voltage with a sensed current associated with a switch operatively coupled to the first driver; and a comparator to generate the second driver control signal based on the combined signal and the compensated signal.

15. A method comprising:

receiving, by driver control circuitry of a power conversion system, at least one of a first driver control signal or a second driver control signal from a hysteretic control system of the power conversion system operatively coupled to a first driver and a second driver, wherein the second driver control signal is an inverse of the first driver control signal; and controlling, by the driver control circuitry and based on at least one of the first driver control signal or the second driver control signal, operation of at least one of the first driver or the second driver wherein the hysteretic control system comprises a first hysteretic control subsystem, operatively coupled to a first input of the driver control circuitry, to generate the first driver control signal based on a hysteretic control signal; and wherein the hysteretic control system further comprises a second hysteretic control subsystem operatively coupled to a second input of the driver control circuitry, the second hysteretic control subsystem being configured to generate the second driver control signal by performing a logical AND operation based on the hysteretic control signal and a peak current mode control signal.

16. The method of claim 15, wherein the first input of the driver control circuitry is a set input of state storage circuitry comprising at least one of a flip-flop or a latch, and wherein the second input of the driver control circuitry is a reset input of the state storage circuitry.

17. The method of claim 15, wherein controlling the operation of at least one of the first driver or the second driver comprises:

enabling the first driver in response to the first driver control signal being high; or disabling the first driver in response to the first driver control signal being low.

18. The method of claim 15, wherein the first hysteretic control subsystem comprises:

a comparator to generate a comparator output signal based on a feedback signal and a reference signal each received by the comparator;

an AND gate to generate an AND gate output signal based on the comparator output signal and a clock signal each received by the AND gate; and an OR gate to generate the first driver control signal based on the hysteretic control signal and the AND gate output signal each received by the OR gate.

19. The method of claim 18, wherein the reference signal has a voltage that is less than a reference voltage for the power conversion system.

20. The method of claim 19, wherein the reference signal has a voltage that ranges between about 97% of the reference voltage and about 99% of the reference voltage.

\*   \*   \*   \*   \*